US006530525B1

(12) United States Patent
Price et al.

(10) Patent No.: US 6,530,525 B1
(45) Date of Patent: Mar. 11, 2003

(54) SHEET COUNTING APPARATUS AND METHOD

(75) Inventors: John Gerwyn Price, Hants (GB); Phillip Michael William Ireland, Hampshire (GB)

(73) Assignee: De la Rue International Limited, Basingstoke (GB)

( * ) Notice: Subject to any disclaimer, the term of this patent is extended or adjusted under 35 U.S.C. 154(b) by 0 days.

(21) Appl. No.: 09/673,724

(22) PCT Filed: Mar. 14, 2000

(86) PCT No.: PCT/GB00/00925

§ 371 (c)(1), (2), (4) Date: Nov. 13, 2000

(87) PCT Pub. No.: WO00/60538

PCT Pub. Date: Oct. 12, 2000

(30) Foreign Application Priority Data

Apr. 1, 1999 (GB) ............................................. 9907738

(51) Int. Cl.[7] ................................................ G06K 13/00
(52) U.S. Cl. ...................................................... 235/477
(58) Field of Search .......................... 235/477; 209/584, 209/900; 377/8

(56) References Cited

U.S. PATENT DOCUMENTS

| | | | | |
|---|---|---|---|---|
| 4,385,229 A | * | 5/1983 | Middleditch | 271/95 |
| 5,454,017 A | * | 9/1995 | Price et al. | 377/8 |

FOREIGN PATENT DOCUMENTS

| | | |
|---|---|---|
| EP | 0 616 300 A2 | 9/1994 |
| GB | 2 238 895 A | 6/1991 |

* cited by examiner

*Primary Examiner*—Thien M. Le
*Assistant Examiner*—Kumiko C. Koyama
(74) *Attorney, Agent, or Firm*—Oliff & Berridge, PLC

(57) ABSTRACT

Sheet counting apparatus includes a set of rotatably mounted suction spindles mounted for movement past a stack of sheets to be counted. A vacuum is connected to the spindles. As a suction spindle passes the stack, the vacuum is supplied to the spindle so that the topmost sheet is deflected from its initial position. A monitor monitors the number of deflected sheets by monitoring the degree of vacuum within the suction spindle passing the stack. The monitor increments a count on each occasion when the monitored vacuum exceeds a predetermined level threshold for a predetermined time.

8 Claims, 6 Drawing Sheets

SHEET COUNTING APPARATUS AND METHOD

BACKGROUND OF THE INVENTION

1. Field of the Invention

The invention relates to an apparatus and method for counting sheets, particularly security documents such as banknotes.

2. Description of Related Art

It is already known to provide apparatus for counting sheets held in a stack, the apparatus comprising a set of rotatably mounted suction spindles mounted for movement past a stack of sheets to be counted, vacuum supply means connected to the spindles, whereby as a suction spindle passes the stack, a vacuum is supplied to the spindle so that the topmost sheet is deflected from its initial position; and monitoring means for monitoring the number of deflected sheets. Such apparatus is hereinafter referred to as of the kind described and is commonly referred to as a "spindle counter".

Most spindle counters require a minimum pressure (vacuum) to be maintained within the system with the counting being achieved by means of external electromagnetic/photoelectric sensors which operate independently of the vacuum system provided the minimum pressure is maintained. An example is described in GB-A-2041888.

Another approach is to detect changes in the pressure or vacuum supplied to the spindles. An increase in vacuum (decrease in pressure) corresponds to a sheet being deflected and this change can be used to implement a count. Examples of such spindle counters are described in GB-A-2238411, GB-A-2238895, GB-A-2137000 and GB-A-1530652.

In some of these known spindle counters, for example those described in GB-A-2238411 and GB-A-2238895, it is necessary to index the spindles to a known position prior to the start of the count process. This is undesirable.

A further problem with systems such as that described in GB-A-2238895 is that if a spindle fails to deflect a note during a count process, the system will stop. This leads to problems in that the whole process has to be restarted.

In EP-A-0616300 we describe some developments of a spindle counter. In one aspect, a count process is only terminated when at least two spindles pass the stack without deflecting a sheet. We also describe a method of adapting the predetermined level threshold over a period of time.

Although the spindle counter described in EP-A-0616300 works well, there is a continuing need to increase accuracy, particularly at higher sheet counting rates.

For example, it is known that as the sheet counting rate is increased (by increasing the rate of rotation of the spindles) the width of the vacuum pulse caused by the sheet being held by suction on the active spindle face reduces proportionally. However, it has been determined from experience, that as the sheet counting rate is increased, the characteristics, such as sheet size, material porosity, sheet stiffness and variations which exist between the individual sheets, of the sheets within a stack, which increasingly effect the accuracy of the counting also manifest themselves not only in the signal level but also in the shape of the vacuum pulse caused by the sheet being held by suction on the active spindle face.

Furthermore, associated with increasing the count speed of spindle counters a problem can occur when it is required that the power of motor used to rotate the spindle head is not to be increased, or is required to be reduced, so that it takes more time for the head to accelerate to reach its nominal rotating speed and decelerates to stop.

SUMMARY OF THE INVENTION

In accordance with one aspect of the present invention, sheet counting apparatus comprises a set of rotatably mounted suction spindles mounted for movement past a stack of sheets to be counted, vacuum supply means connected to the spindles whereby as a suction spindle passes the stack, a vacuum is supplied to the spindle so that the topmost sheet is deflected from its initial position; and monitoring means for monitoring the number of deflected sheets, wherein the monitoring means monitors the degree of vacuum within the suction spindle passing the stack whereby the monitoring means increments a count on each occasion when the monitored vacuum exceeds a predetermined level threshold for a predetermined time.

In accordance with a second aspect of the present invention, a method of counting sheets using apparatus comprising a set of rotatably mounted suction spindles mounted for movement past a stack of sheets to be counted, whereby as a suction spindle passes the stack, a vacuum is supplied to the spindle so that the topmost sheet is deflected from its initial position comprises monitoring the degree of vacuum within a suction spindle passing the stack and incrementing a count on each occasion when the vacuum exceeds a predetermined level threshold for a predetermined time.

We have found that the problems described above can be overcome by considering the time during which the monitored vacuum exceeds the predetermined level threshold. Thus, it is not sufficient for the vacuum just to exceed the threshold in order to count a sheet but that condition must be maintained for the predetermined time.

The predetermined time may be set by the operator and typically this will be determined in accordance with the expected rotational rate of the spindles. In other examples, the predetermined time could be set, at least initially, automatically in accordance with the rotational speed of the spindles. Thus, the monitoring means may determine the rotation rate of the spindles and obtain the required predetermined time from a look-up table or the like.

In many cases, the spindle speed will vary during a count process and, of course, this will always happen at start-up when there is an acceleration in spindle speed and at the end of a count operation when there is a deceleration. These changes in speed will mean that the time during which the vacuum exceeds the predetermined level threshold will vary even for sheets of exactly the same type and condition. Consequently, in the preferred case, the predetermined time is varied. This may be achieved by monitoring the rotational speed of the spindles and/or by computing a rolling average of a predetermined number of previous times during which the monitored vacuum exceeded the predetermined level threshold.

A typical number of such predetermined times will be eight and, of course, in order to avoid erroneous values being utilized, the times could be compared with a minimum threshold with only those times which exceed this minimum threshold being used to compute the rolling average. This will then eliminate problems due to noise and the like.

In addition to varying the predetermined time, the predetermined level threshold could also be varied as described in more detail in EP-A-0616300. This then overcomes problems which may be encountered if the vacuum level changes, particularly reduces, for reasons such as porosity of the notes, and the reduction in force with which the stack of sheets is fed towards the suction spindles.

BRIEF DESCRIPTION OF THE DRAWINGS

An example of a spindle counter and the method according to the invention will now be described with reference to the accompanying drawings, in which.

DETAILED DESCRIPTION OF EXEMPLARY EMBODIMENTS

Figure 1:
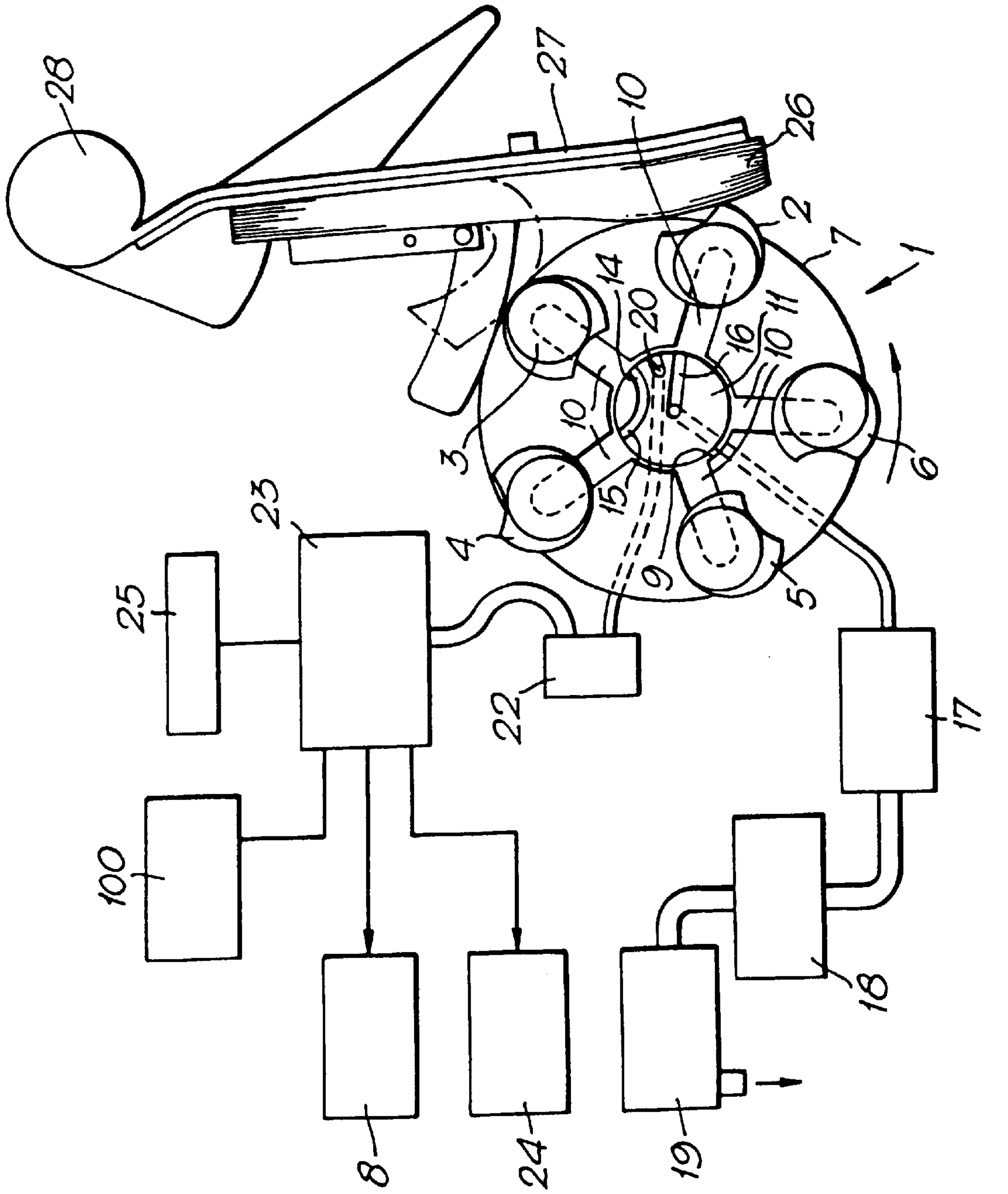
FIG. 1 is a schematic diagram of the apparatus with the head in a first position.
Figure 3:
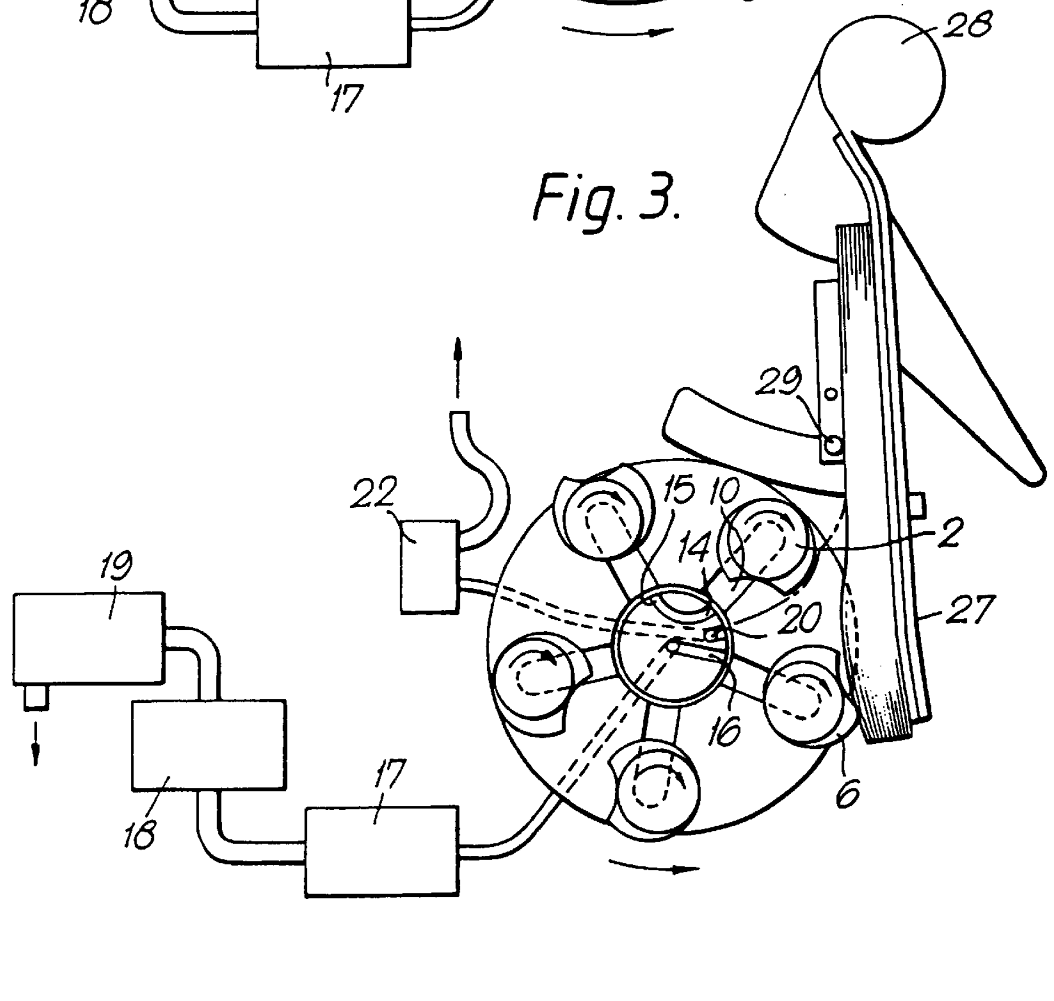
FIG. 3 is a view similar to FIG. 2 with the head in a third position.

The apparatus shown in FIGS. 1 and 3 is of substantially conventional form, particularly the construction of the head 1. The head 1 comprises five substantially equally angularly spaced suction spindles 2–6 rotatably mounted to a main support 7 which itself is rotatable under the control of a head motor 8. The support 7 is rotated in use in an anti-clockwise direction (as seen in FIG. 1) while the suction spindles 2–6 are rotated in a clockwise direction. The gear assemblies for achieving these rotations are well known and will not be described further.

Figure 4:
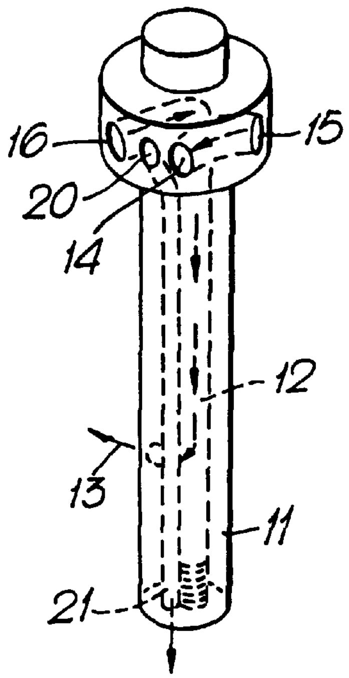
FIG. 4 illustrates the centre spindle in more detail.

The support 7 has a central bore extending along its axis and communicating with a set of five ports 10 which communicate with respective suction spindles 2–6. The support 7 rotates about a central spindle 11 mounted within the bore 9 and shown in more detail in FIG. 4. The central spindle 11 has a central bore which is connected to an exhaust port at one end which in turn is connected to a head valve 17, filter 18 and a vacuum pump 19. At its end level with the ports 10, the bore terminates in port 16. Circumferentially spaced exhaust ports 14,15 are provided for communication with the ports 10. Between the ports 14,16 is a counting port 20 which communicates through a bore 21 in the central spindle 11 with a pressure transducer 22.

The pressure transducer 22 is of conventional form and generates an electronic signal related to the sensed pressure. This signal is fed to a microprocessor 23 connected to control the head motor 8, a stack motor 24, and a display 25. The operation of the processor 23 will be described in more detail below.

A stack of sheets 26 to be counted are loaded into a support plate 27 pivoted to a shaft 28 (FIG. 2) the end of the stack nearest the shaft 28 being clamped in position by a clamp pin 29 mounted on an arm 30.

Figure 2:
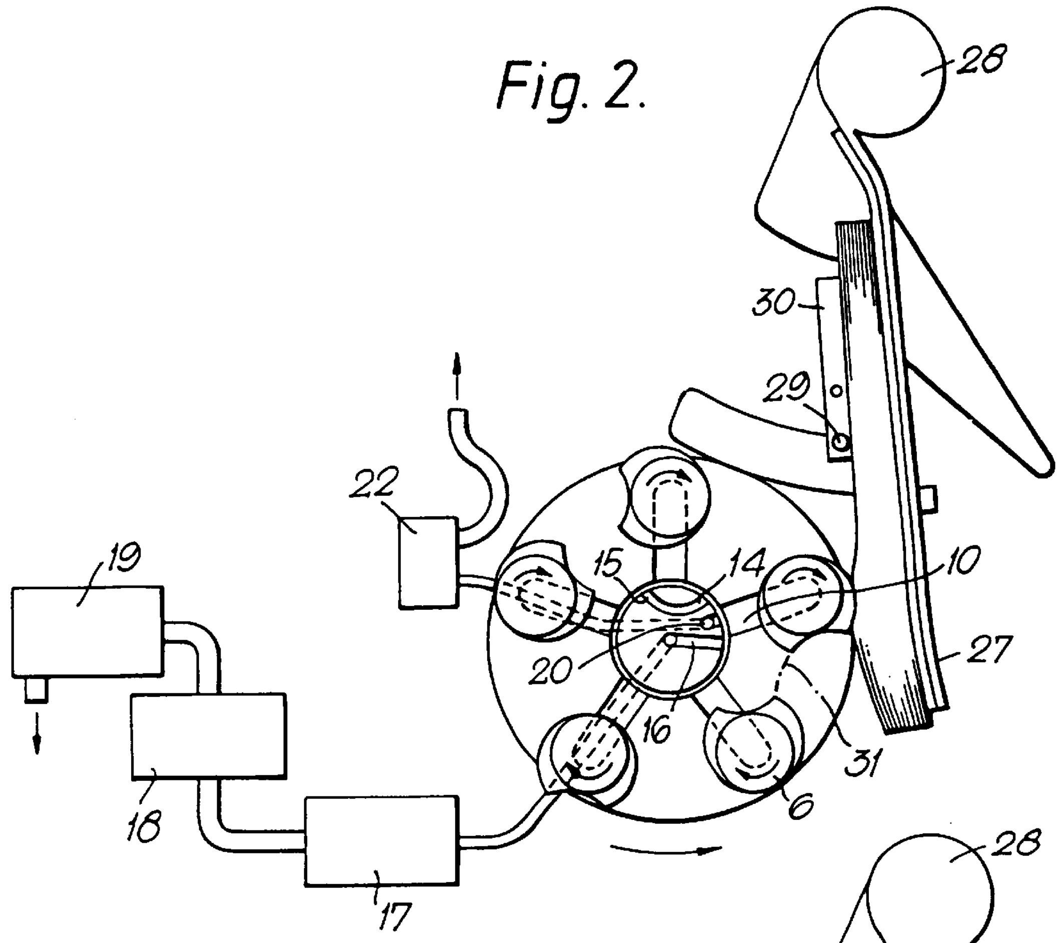
FIG. 2 is a view similar to FIG. 1 (with parts omitted) with the head in a second position.

In operation, the support plate 27 carrying a stack of sheets such as banknotes is brought to the position shown in FIGS. 1–3 and the processor 23 is then instructed to control the head motor 8 to start operation. The head motor 8 rotates the support 7 in an anti-clockwise direction thereby causing the spindles 2–6 to rotate in a clockwise direction and the first spindle 2 will arrive at the stack 26 (FIG. 1). A vacuum is supplied from the vacuum pump 19 to the port 16 so that as the port 10 associated with the spindle 2 approaches the position shown in FIG. 1, the vacuum will be communicated through the port 16 and port 10 to the suction spindle 2. The suction spindle 2 will thus suck the topmost banknote against its outer periphery. Further rotation of the support 7 and spindle 2 draws the topmost banknote (shown at 31 in FIG. 2) away from the stack. As the spindle 2 continues to rotate, the port 10 associated with the spindle 2 will move round to overlap the vacuum and counting ports 16,20. This has the effect of connecting the vacuum to the transducer 22 via the bore 21 so that the transducer sees the high level of vacuum. As the head 1 continues to rotate, the port becomes disconnected from the vacuum port 16 remaining connected only to the counting port 20 (FIG. 2). Shortly after this, as the head continues to rotate, the port 10 associated with spindle 2 will overlap both the counting port 20 and exhaust port 14. This allows the vacuum present in the sealed spindle to be opened to the atmosphere via ports 14 and 15, cancelling the stored vacuum. This also opens the counting port 20 to the atmosphere. At this time the sheet held by the spindle 2 is released due to the loss of vacuum and further rotation brings the port 10 solely into line with port 14 (FIG. 3). As the head 1 rotates further, the sequence repeats for the next spindle 6 and so on.

Due to the overlapping action of the counting port 20 with the vacuum and exhaust ports 16,14, the transducer 22 will see first a rise in vacuum, followed by a drop as the port 20 is connected to the exhaust port 14. This means that for each sheet the transducer will see a pulse, allowing the processor 23 to count these pulses and thereby count the number of sheets in the stack. This number is then displayed on the display 25 which is in the form of a LCD or the like.

Figure 5:
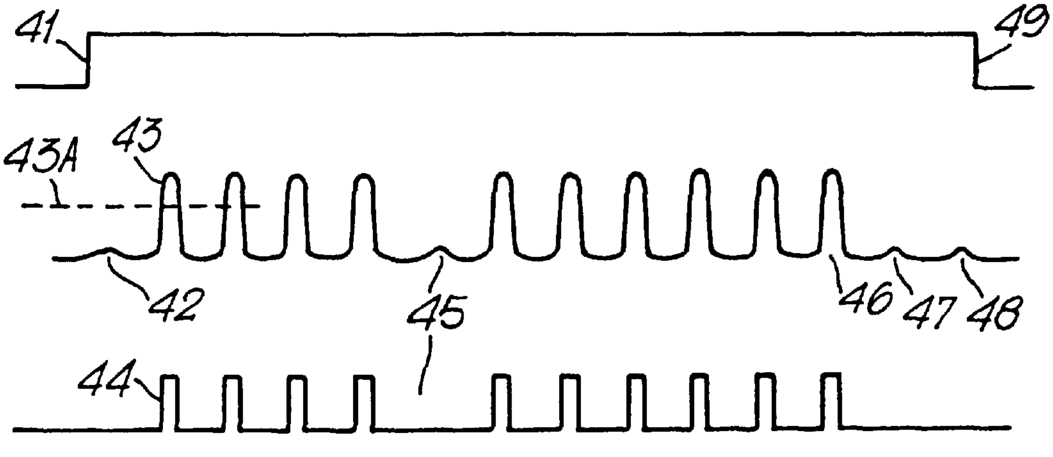
FIG. 5 illustrates a typical count sequence.

FIG. 5 illustrates a typical count sequence. Initially, the processor 23 activates the head motor 8 (step 41). The head 1 then begins to rotate and in this case, the first head 2 fails to pick the topmost sheet from the stack. Consequently, as shown in 42, only a small rise in vacuum level is measured. This rise does not exceed a predetermined level threshold 43A and consequently no count pulse is generated within the processor 23. The next spindle successfully picks the topmost sheet thus causing a significant vacuum to be communicated into the counting port 20 so that the transducer 22 senses a drop in pressure which exceeds the predetermined level threshold 43A. This is indicated at 43 in FIG. 5. As soon as the sensed vacuum exceeds the threshold, the processor 23 will generate a count pulse 44 which increments an internal count while the count to date is displayed on the display 25.

This process continues as shown in FIG. 5 but where a spindle fails to pick a sheet, as at 45, no count pulse is generated. After the failure 45, the next spindle successfully picks the note so that counting continues until the last sheet is picked as shown at 46. After this, two further spindles will attempt to pick sheets from the stack but since no sheets will be picked, only small changes in vacuum level will be sensed as shown at 47 and 48. Other modes of operation are possible. For example, the count process could be terminated after a single spindle fails to pick a note.

The processor 23 is programmed to expect a count pulse within a certain time period and consequently if the time period passes without a count pulse being generated then the processor decides that the counting process should terminate and switches off the head motor at step 49. The time period will usually be long enough to permit two or three spindles to attempt to pick a note.

Figure 6:
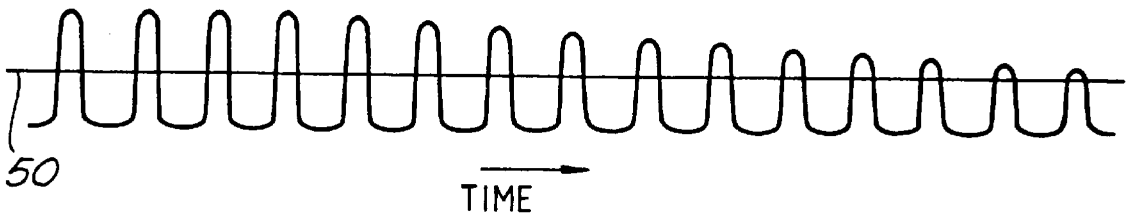
FIG. 6 illustrates the variation of sensed pressure against a constant threshold.

In the example just described it has been assumed that the vacuum level threshold is constant throughout the counting process. FIG. 6 illustrates such an example in which the threshold level is indicated at 50. As can be seen, the vacuum signal drops with time due to the decrease in the pressure with which the stack is urged towards the spindles. This could result in a vacuum level due to a sheet not exceeding the threshold with the result that the sheet is not counted.

Figure 7:
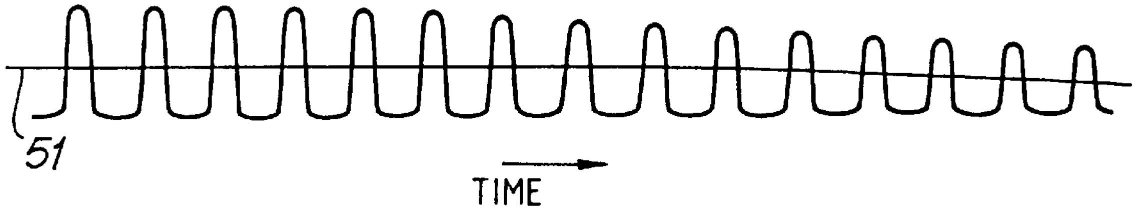
FIG. 7 illustrates the variation of sensed pressure against an adaptive threshold.

To overcome this problem, the processor 23 can monitor and store in a store 100 the last N vacuum threshold levels which exceeded a threshold (N is typically eight) and were used to increment the count and can compute an average of those N levels from which a new threshold is calculated. For example, the processor could compute the average of the last three vacuum levels which exceeded a threshold and define the new threshold as being a proportion, for example 25–50%, of the new average. FIG. 7 illustrates a threshold level 51 which is varied using this technique and it can be seen that later pulses although having a smaller absolute vacuum level magnitude, exceed the current threshold by similar proportions to the initial levels.

Figure 8A:
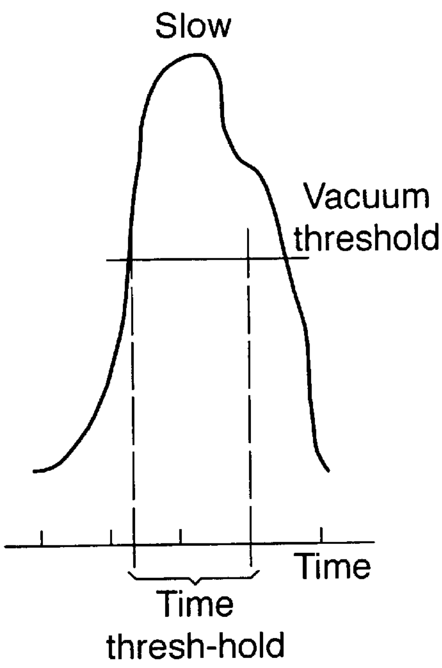
FIGS. 8*a*–8*e* illustrate how the time during which the vacuum threshold is exceeded varies in accordance with count rate and note condition; and, FIG. 9 illustrates the variation of time for which the vacuum exceeds the threshold during acceleration and deceleration.
Figure 8B:
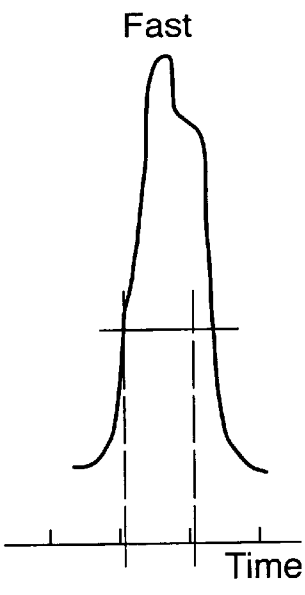
Figure 8C:
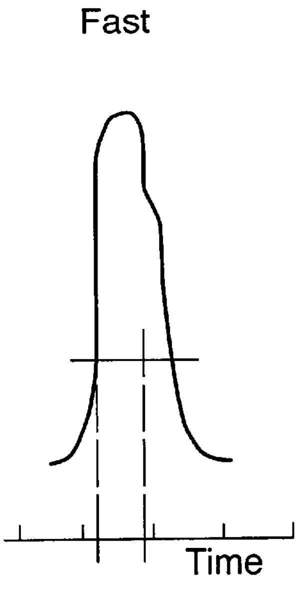
Figure 8D:
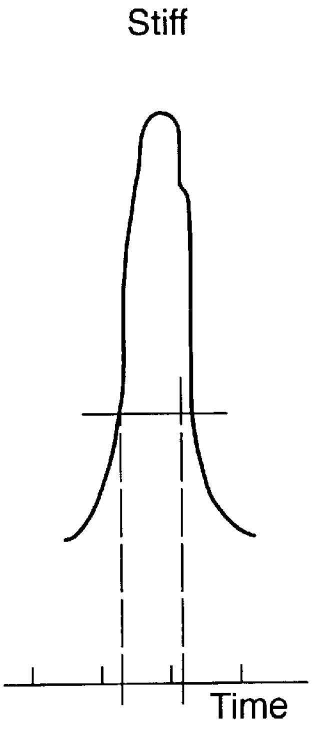
Figure 8E:
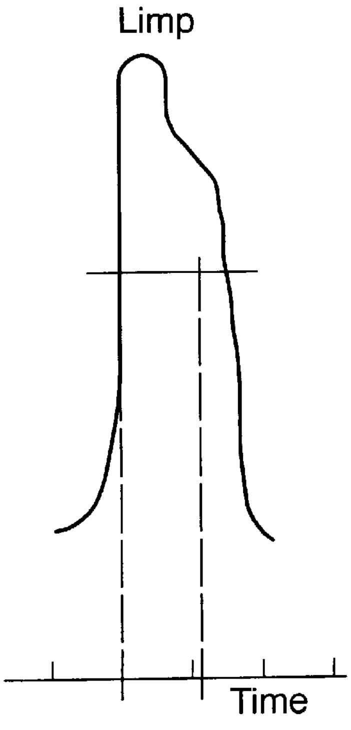

So far, it has been assumed that the count will be incremented on every occasion for which the vacuum exceeds the threshold 43A. As can be seen in FIG. 8, this time will vary under different conditions. For example, comparing FIGS. 8*a* and 8*b*, it can be seen that for sheets of the same type and condition, the vacuum is exceeded for a comparatively long time during a slow rotation rate of the spindles and for a relatively short time (FIG. 8*b*) for a relatively fast rotation rate. In addition, conditions such as porosity, stiffness and limpness can effect the time as shown in FIGS. 8*c*–8*e* respectively. In order to cope with these variations, the predetermined time is adapted during a count cycle by computing a rolling average of a predetermined number of previous times. It will be appreciated that the predetermined number of predetermined times that are averaged may be changed depending on the desired operation of the apparatus but will in any event be greater than two.

Figure 9:
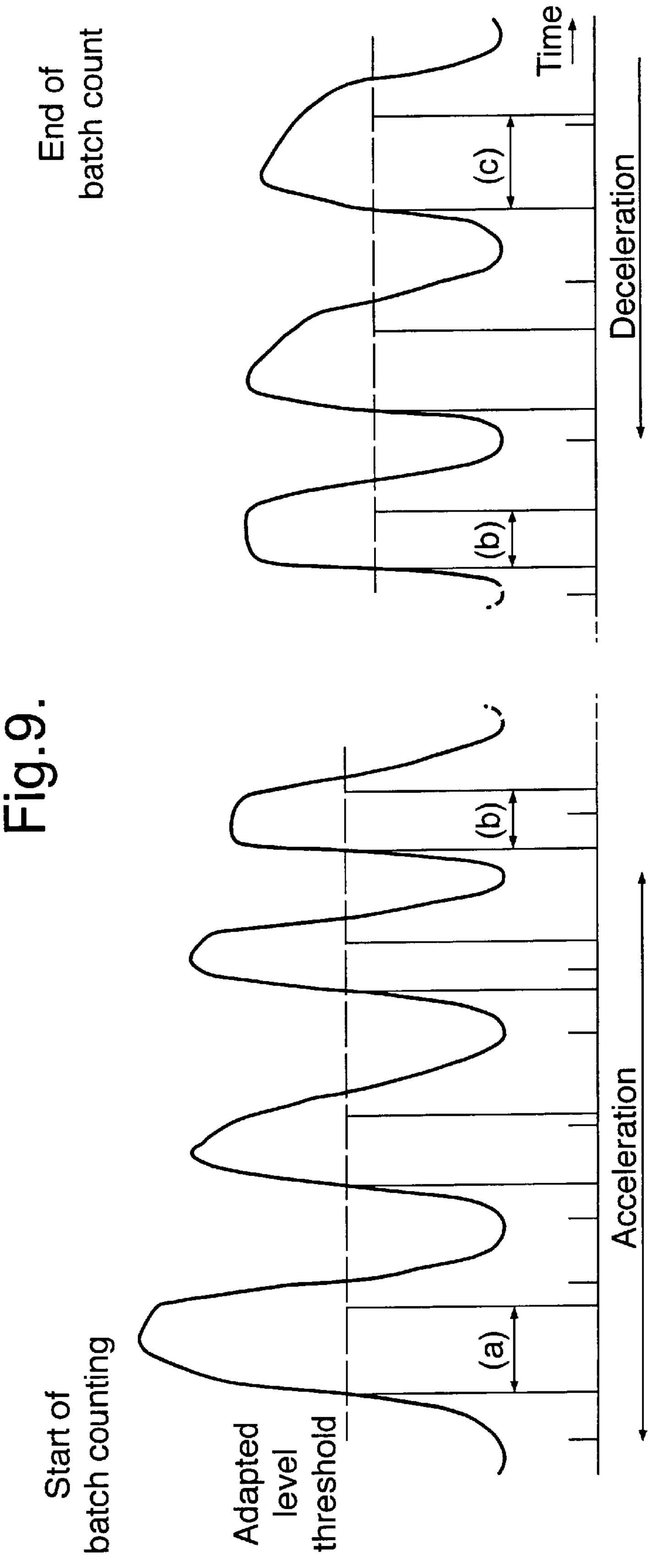

At start-up, an initial predetermined time is set, either manually or by obtaining that time from a memory, the time being suited to the nominal sheet counting rate selected by the operator (as shown at a in FIG. 9). In another alternative, this time threshold could be determined by detecting pulses on a timing disc attached non-rotatably to the spindle head drive motor or some other means for determining the rotational speed. During the acceleration of the spindle up to its nominal speed, the time for which the vacuum exceeds the threshold will decrease and so the predetermined time value must also be decreased. This is achieved by computing a rolling average of previous times until the minimum predetermined time is reached.

During deceleration, the time for which the vacuum exceeds the threshold will increase and so a corresponding increase in the predetermined time from (b) to (c) will be computed using the rolling average.

The count is then incremented whenever the vacuum signal level exceeds the threshold for a time exceeding the predetermined time currently set.

What is claimed is:

1. Sheet counting apparatus comprising a set of rotatably mounted suction spindles mounted for movement past a stack of sheets to be counted, vacuum supply means connected to the suction spindles whereby as a suction spindle passes the stack, a vacuum is supplied to the suction spindle so that a topmost sheet is deflected from its initial position; and monitoring means for monitoring a number of deflected sheets, wherein the monitoring means monitors a degree of vacuum within the suction spindle passing the stack whereby the monitoring means increments a count on each occasion when a monitored vacuum exceeds a predetermined level threshold for a predetermined time.

2. Apparatus according to claim 1, wherein the monitoring means is adapted to set the predetermined time, at least initially, in accordance with a rotational speed of the spindles.

3. Apparatus according to claim 1, wherein the monitoring means is adapted to determine the predetermined time by computing a rolling average of a predetermined number of previous times during which the monitored vacuum exceeded the predetermined level threshold.

4. Apparatus according to claim 1, wherein the monitoring means is adapted to modify the predetermined level threshold by regularly resetting the threshold at a preset proportion of a rolling average of a predetermined number of previous vacuum levels detected as indicating a deflection of a sheet.

5. A method of counting sheets using apparatus comprising a set of rotatably mounted suction spindles mounted for movement past a stack of sheets to be counted, whereby as a suction spindle passes the stack, a vacuum is supplied to the spindle so that a topmost sheet is deflected from its initial position, the method comprising monitoring a degree of vacuum within a suction spindle passing the stack and incrementing a count on each occasion when the vacuum exceeds a predetermined level threshold for a predetermined time.

6. A method according to claim 5, further comprising setting the predetermined time, at least initially, in accordance with a rotational speed of the spindles.

7. A method according to claim 5, further comprising determining the predetermined time by computing a rolling average of a predetermined number of previous times during which the monitored vacuum exceeded the predetermined level threshold.

8. A method according to any of claim 5, further comprising adapting the predetermined level threshold by regularly resetting the threshold at a proportion of the rolling average of a predetermined number of previous vacuum levels detected as indicating a deflection of a sheet.

* * * * *